US008601432B2

(12) United States Patent
Bornhoevd et al.

(10) Patent No.: US 8,601,432 B2
(45) Date of Patent: Dec. 3, 2013

(54) SERVICE-BASED PROCESSES USING POLICY-BASED MODEL-TO-MODEL CONVERSION AND VALIDATION TECHNIQUES

(75) Inventors: Christof Bornhoevd, Belmont, CA (US); Aabhas Paliwal, North Brunswick, NJ (US); Nabil Adam, Manhasset, NY (US); Basit Shafiq, Edison, NJ (US)

(73) Assignee: SAP AG, Walldorf (DE)

( * ) Notice: Subject to any disclaimer, the term of this patent is extended or adjusted under 35 U.S.C. 154(b) by 1429 days.

(21) Appl. No.: 11/864,116

(22) Filed: Sep. 28, 2007

(65) Prior Publication Data

US 2009/0089741 A1 Apr. 2, 2009

(51) Int. Cl.
*G06F 9/44* (2006.01)
(52) U.S. Cl.
USPC ............ 717/104; 717/105; 717/106; 717/109
(58) Field of Classification Search
USPC .................................. 717/104, 105, 106, 109
See application file for complete search history.

(56) References Cited

U.S. PATENT DOCUMENTS 7,533,365 B1 * 5/2009 Hogstrom et al. ............ 717/105

OTHER PUBLICATIONS

Atluri, V. et al., "Self-Manifestation of Composite Multimedia Objects to Satisfy Security Constraints", ACM SAC03, 2003, pp. 927-934.

Ter Beek, M. H., et al., "A Survey on Service Composition Approaches: From Industrial Standards to Formal Methods", Technical Report 2006-TR-15, 2006,19 pages.
Cheung, R. C., "A User-Oriented Software Reliability Model", 1980, 13 pages.
Chun, S. A., et al., "Using Semantics for Policy-based Web Services Composition", A special issue on Web Services, Journal of Distributed and Parallel Databases, vol. 18, No. 1, Jul. 2005, pp. 1-28.
Foster, H. et al., "Model-based Verification of web service Compositions", In Proc. IEEE Intl. Conf. on Automated Software Engg. (ASE), 2003, 10 pages.
Hamadi, R. et al., "A Petri net-based model for web service composition", Fourteenth Australasian Database Conference, Conferences in Research and Practice in Information Technology, vol. 17, 2003, 10 pages.
Haugen, A. "Comparing UML 2.0 Interactions and MSC-2000", In SAM, 2004, 15 pages.
Jensen, K. "A brief introduction to colored Petri nets", In Proc. Workshop on the Applicability of Formal Models, 1998, 4 pages.
Kluge, O. "Modelling a Railway Crossing with Message Sequence Charts and Petri Nets", In Petri Net Tech. for Comm.-Based Systems, vol. 2472, 2003, pp. 197-218.
Mauw, S. et al., "High-Level Message Sequence Charts", In Proc. of the English SDL Forum, France, 1997, pp. 1-16.

(Continued)

*Primary Examiner* — Qamrun Nahar
(74) *Attorney, Agent, or Firm* — Brake Hughes Bellermann LLP

(57) ABSTRACT

A modeling tool may be configured to generate a diagrammatic representation of a service-based process, expressed using a diagrammatic modeling language. A model converter may be configured to convert the diagrammatic representation into a formal model of the service-based process, and a model verifier configured to apply constraints to the formal model to verify an operation of the service-based process and output a verified formal model. A code generator may be configured to generate executable code therefrom for executing the service-based process therewith.

20 Claims, 10 Drawing Sheets

(56) References Cited

OTHER PUBLICATIONS

Narayanan, S. et al., "Simulation, verification and automated composition of web services", In Proc. WWW 2002, May 7-11, 2002, 12 pages.

Rodrigues, G., et al, "Using Scenarios to predict the reliability of concurrent component-based software systems.", In Fundamental Approaches to Software Engg (FASE), LNCS vol. 3442, 2005, pp. 111-126.

Sgroi, M., et al, "Synthesis of Petri Nets from Message Sequence Charts Specifications for protocol Design", In Proc. DASD' 04, 2004, pp. 193-199.

Winkelmann, K. et al., "Prospective Analysis of Cooperative Provision of Industrial Services Using Coloured Petri Nets", LNCS vol. 4024, 2006, pp. 362-380.

Yang, J. et al., "Web component: A substrate for web service reuse and composition", In CAiSE, 2002, pp. 1-17.

Yang, Y. et al., "Verifying web services composition based on hierarchical colored petri nets", In Proceedings of IHIS '05, 2005.

Yi, X. et al., "A CP-nets-based Design and Verification Framework for Web Services Composition", In Proc. of the IEEE International Conference on Web Services, 2004, 5 pages.

Van Der Aalst, W. et al., "Let's Go All the Way: From Requirements via Colored Workflow Nets to a BPEL Implementation of a New Bank System", In Proc. CoopIS '05, 2005, 18 pages.

Adam, N. et al., "Secure Information Sharing in a Virtual Multi-Agency Team Environment", Electronic Notes in Theoretical Computer Science, vol. 179, Jul. 6, 2007, pp. 97-109.

Aiello, M. et al., "A Request Language for Web-Services Based on Planning and Constraint Satisfaction", Procedure of Third International Workshop on Technologies for E-Services, 2002, pp. 76-85.

Yi, X. et al., "A Design and Analysis Framework for Choreographing Conversational Services", 2006, 52 pages.

Yi, X. et al, "Process Composition of Web Services with Complex Conversation Protocols: A Colored Petri Nets Based Approach", DASD '04, pp. 141-148.

Foster, H. "A Rigorous Approach to Engineering Web Service Compositions", Jan. 2006, 207 pages.

Yang, Yanping et al.,"Model Transformation Based Verification of Web Services Composition", GCC 2005, LNCS 3795, 2005, 1 page.

* cited by examiner

US 8,601,432 B2

SERVICE-BASED PROCESSES USING POLICY-BASED MODEL-TO-MODEL CONVERSION AND VALIDATION TECHNIQUES

TECHNICAL FIELD

This description relates to service-based processes.

BACKGROUND

Software applications having one or more specific functionalities may be exposed to other applications, often over a network (e.g., the Internet) by way of a service interface. When such a service (and/or an interface of the service) is exposed/available over the World Wide Web (referred to herein as the WWW or the web), then the service may be known as a web service. Interactions between such services may be orchestrated so that the services (e.g., web services) may be used as components of a larger, often more complex, software application, which may be referred to as web services-based process(es) (WSPs). More generally, such compositions of services into a logical flow for a resulting configuration of services to behave as a cohesive application may be referred to as a service-oriented architecture (SOA).

Modeling languages exist which provide for, among other functionalities, a graphical, intuitive representation of WSP or other SOA application(s). For example, the Unified Modeling Language (UML) may be used as such a modeling language that provides a visual illustration of interactions between component services. Further, state-based models exist which may be used to specify possible states of the WSP or other SOA applications. Still further, languages exist, such as, for example, the Business Process Execution Language (BPEL), that are designed to provide executable or semi-executable forms of the WSP or other SOA application, e.g., for execution using an orchestration engine or other technique.

In practice, these various languages and techniques have different strengths and weaknesses which, on the whole, may make it difficult for a given user to design and implement a WSP or other SOA application. For example, a user who is comfortable with the diagrammatic, interaction-based representation of a graphical modeling language may find it difficult to design or use either a more formal state-based model, or an executable form of the graphical model. In particular, for example, when a number of possible users may implement a given WSP, it may be difficult to determine whether a particular one of the users (or a particular class of the users) will be able to execute a corresponding instance of the WSP in a desired manner. Consequently, a full deployment, adaptation, and use of WSPs and other SOA applications may be hindered.

SUMMARY

According to one general aspect, a modeling tool may be configured to generate a diagrammatic representation of a service-based process, expressed using a diagrammatic modeling language. A model converter may be configured to convert the diagrammatic representation into a formal model of the service-based process, and a model verifier configured to apply constraints to the formal model to verify an operation of the service-based process and output a verified formal model. A code generator may be configured to generate executable code therefrom for executing the service-based process therewith.

According to another general aspect, a diagrammatic representation of a service-based process may be generated, and may be expressed using a diagrammatic modeling language. The diagrammatic representation may be converted into a formal model of the service-based process, and constraints may be applied to the formal model to verify an operation of the service-based process and output a verified formal model. Executable code may be generated therefrom for executing the service-based process therewith.

A computer program product may be tangibly embodied on a computer-readable medium and may include executable code that, when executed, is configured to cause a data processing apparatus to generate a diagrammatic representation of a service-based process, expressed using a diagrammatic modeling language, convert the diagrammatic representation into a formal model of the service-based process, apply constraints to the formal model to verify an operation of the service-based process and output a verified formal model, and generate executable code therefrom for executing the service-based process therewith.

The details of one or more implementations are set forth in the accompanying drawings and the description below. Other features will be apparent from the description and drawings, and from the claims.

DETAILED DESCRIPTION

Figure 1:
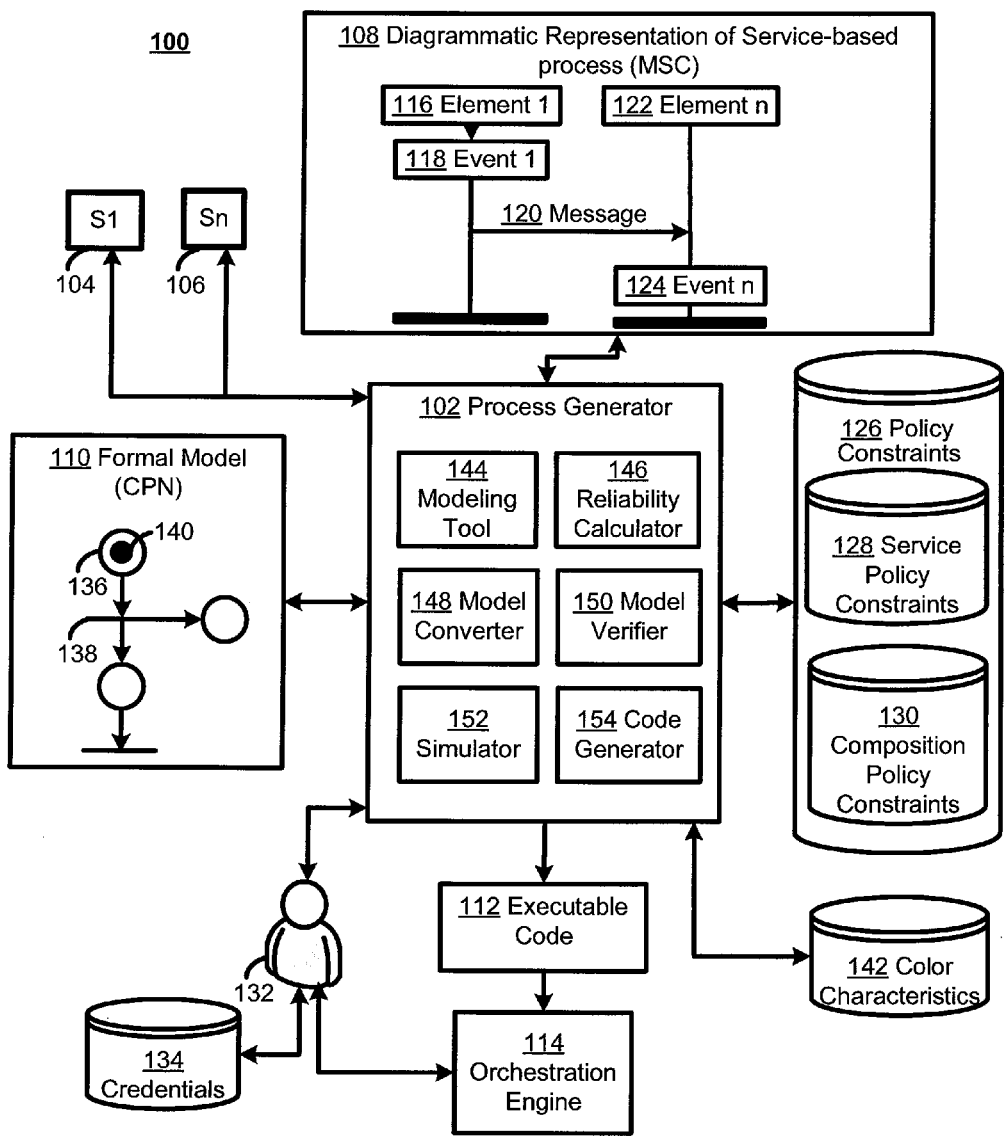
FIG. 1 is a block diagram of a system for implementing service-based processes using policy-based, model-to-model conversion and validation techniques.

FIG. 1 is a block diagram of a system 100 for implementing service-based processes using policy-based, model-to-model conversion and validation techniques. In the example of FIG. 1, a process generator 102 is illustrated that may be used to compose a plurality of services, represented conceptually in FIG. 1 as two services 104, 106, into a web services-based process (WSP) or other service oriented architecture (SOA) application. More particularly, the process generator 102 may be used to design a diagrammatic representation 108 of a desired service-based process, convert the diagrammatic representation 108 into a formal model 110, and then generate executable code 112 for execution of the service-based process within an orchestration engine 114.

In so doing, the system 100 and the process generator 102 provide a number of features and advantages. For example, the process generator 102 allows for the specification of a service-based process, such as a WSP, using an intuitive, understandable, and graphical representation that may be useful to potentially non-technical users (e.g., business user(s)), i.e., the diagrammatic representation 108. At the same time, the process generator 102 allows such a user(s) to obtain a formal, state-based representation (i.e., the formal model 110), which may be useful in for example determining goal reachability for the service-based process. For example, such goal reachability analysis may be useful when determining whether a particular user or class of users may be able to reach a certain state of an instance of the service-based process. Then, once it is determined that the service-based process has been designed and implemented in a desired manner, the process generator 102 may be used to generate the executable code 112 for deployment and execution in the orchestration engine 114.

In the example of FIG. 1, the diagrammatic representation 108 is illustrated as a messaging sequencing chart (MSC). As is known, such a MSC may represent an interaction-based model in which services interact with one another by passing chronologically-ordered messages in response to occurrence of determined events. That is, the MSC proceeds along vertical timelines with time advancing from top to bottom, so that, as generally illustrated in FIG. 1, such a MSC may represent a first element, e.g., an "element 1" 116 such as the service 104 and/or related hardware component, which may respond to an "event 1" 118 by generating a message 120. Meanwhile, an "element n" 122 such as the service 106 may respond to the message 120 be generating an "event n" 124. For example, the element 116 may represent a sensor that senses the event 118 and generates the message 120 about the sensed event 118. Then, a report generator as the element 122 may receive the message 120 and generate a report as the event 124. More detailed explanation and examples of a MSC are provided below, e.g., with respect to FIG. 5.

In FIG. 1, design and implementation of the diagrammatic representation 108, and its conversion into, and use as, the formal model 110, may occur based on pre-determined policy constraints 126. Specifically, these policy constraints 126 may include, for example, service policy constraints 128 and composition policy constraints 130.

For example, the service policy constraints 128 may refer to the component services 104, 106, with reference to a user (e.g., service requestor) 132 having credentials 134 that represent requestor attributes associated with access (or lack of access) to one or more of the services 104, 106 (or specific functionalities thereof). Meanwhile, the composition policy constraints 130 may refer, for example, to service constraints, inter-service constraints, and security constraints, any or all of which may be specific to each individual service 104, 106, without regard for the particular user 132 or credentials 134. Further details and examples regarding the content and use of the policy constraints 126 are provided in more detail below.

In FIG. 1, the formal model 110 is illustrated as a colored Petri net (CPN). In general, a Petri net refers to a known modeling language or technique in which arcs (direct arcs) may run between "places" (such as a place 136) and "transitions" (such as a transition 138), where the transitions are referred to as having either "input places" (if leading to a transition by way of an arc) or "output places" of the transition (if receiving an arc from a transitions). Such Petri nets may be used, for example, to provide state-based model(s) of actions associated with workflow processing or other service-based processes. The places of the Petri net may contain tokens (such as a token 140, where, in BPEL, and in other contexts and languages, activation of branches or activities may be referenced or described as passing or routing a control token(s)), so that transitions may be said to respond to input tokens by "firing," where an enabled transition may fire if there are tokens in each input place of the transition. When firing, a transaction uses tokens from its input places, executes any associated processing, and puts tokens into the various output places. In standard Petri nets, such tokens are indistinguishable from one another, while colored Petri nets provide an extension in which each token has a specific value (represented as a color), where such values may be used to base expressions and make decisions. Consequently, in FIG. 1, a database or other memory 142 of color characteristics may be used by the process generator 102 to represent possible values of the tokens (e.g., the token 140), perhaps in relation to the credentials 134 and/or the policy constraints 126. Specific examples of the implementation and use of the CPN and associated color characteristics relative to credentials and constraints are provided in more detail, below.

Thus, the process generator 102 provides for a unified methodology for a design representation of a service-based process, a formal specification for (verification and instantiation of) such a process, and executable code for executing the process. In this way, an easy-to-understand process representation (e.g., the diagrammatic representation 108) may facilitate conformance of process correctness for a non-technical designer, while the formal specification (e.g., the formal model 110) ensures goal reachability analysis of service orchestration for executing the process, and, in particular, provides such goal reachability analysis for a particular instance of the process, relative to a particular user or class of users. By providing an automatic mapping between the diagrammatic representation 108 and the formal model 110, the process generator 102 allows a process designer the opportunity to obtain a verified formal model (e.g., verified with respect to policy constraints 126 and/or user credentials 134) simply by designing the diagrammatic representation 108. Then, the process generator 102 may provide for generation of some or all of the executable code 112 that may be needed for execution of the formal model 110.

In the example of FIG. 1, the process generator 102 may include a modeling tool 144 that allows a designer to design the diagrammatic representation 108. In the examples provided herein, the diagrammatic representation is illustrated as a message sequencing chart (MSC) or high-level MSC (HMSC), although, as already referenced, other modeling languages, such as UML, also may be used. The example of the MSC and/or HMSC provides an example of a language which is simple enough for design by a non-technical (e.g., business) user, yet rich enough in semantics to have the possibility of being automatically mapped to the formal model 110. The modeling tool 144 may include functionality for discovering, selecting, and composing the services 104, 106, which may span multiple organizations, entities, or other resources. A reliability calculator 146 may be used to analyze the completed diagrammatic representation 108 to determine, e.g., compliance with syntax, semantics, or other formalisms of the modeling language (e.g., MSC) being used.

A model converter 148 may be used to map the diagrammatic representation 108 to the formal model 110. Specific examples of such mapping are provided below, e.g., with respect to FIG. 3 and FIG. 7. In general, however, it may be appreciated that automating this mapping provides the designer with the formal model 110 in an easy, straightforward manner.

Consequently, a model verifier 150 may be used to verify the thus-created formal model 110, relative to the policy constraints 126, the credentials 134, and the color characteristics 142. In particular, as referenced herein, the model verifier 150 provides goal reachability analysis, which allows for enumeration of a set(s) of reachable states for the user 132, before actual execution of the service-based process being constructed. In FIG. 1, a simulator 152 may provide a simulation of an output of the service-based process to the user (requestor) 132, based on the component services that may be invoked as determined by the credentials 134, policy constraints 126, and color characteristics 142. In this way, for example, the user 132 may determine whether a particular result or output of the service-based process being constructed is possible or reachable for the user 132, and, if not, may make appropriate adjustments to the service-based process before generation of the executable code 112 by a code generator 154.

Figure 2:
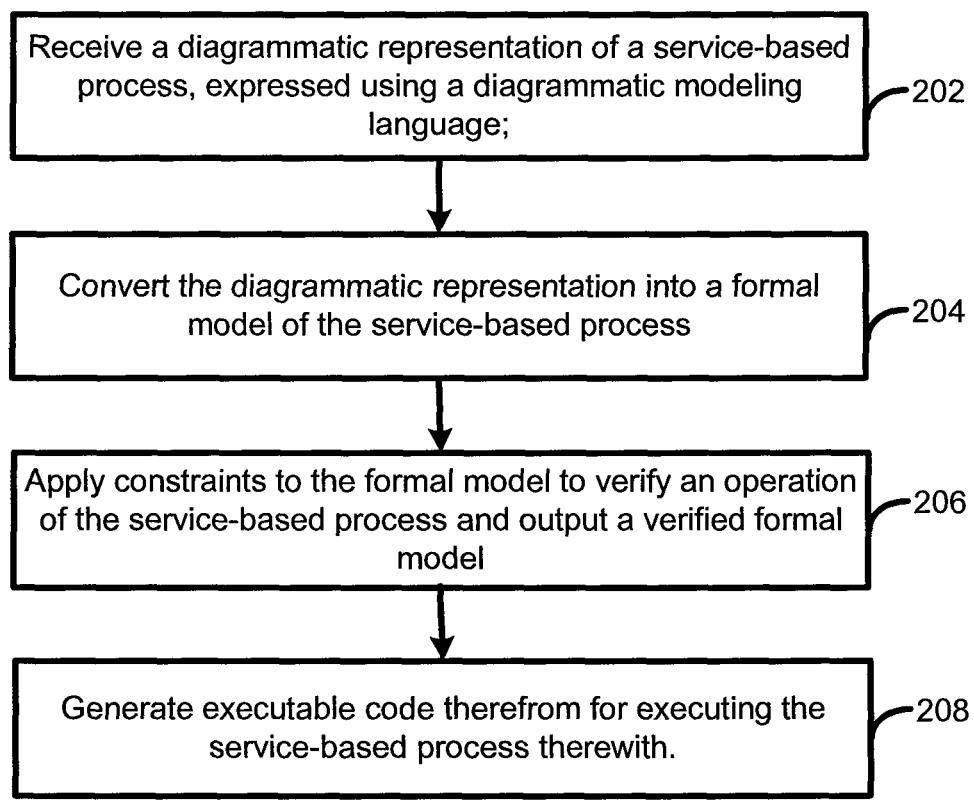
FIG. 2 is a first flowchart illustrating example operations of the system of FIG. 1.

FIG. 2 is a first flowchart 200 illustrating example operations of the system 100 of FIG. 1. In the example of FIG. 2, a diagrammatic representation of a service-based process, expressed using a diagrammatic modeling language, may be received (202). For example, the modeling tool 144 of FIG. 1 may be used to construct a MSC for a service-based process to be constructed using services such as the services 104, 106.

The diagrammatic representation may be converted into a formal model of the service-based process (204). For example, the model converter 148 may convert the MSC 108 into a CPN as the formal model 110. For example, as described below with respect to FIG. 3 and FIG. 7, the model converter 148 may execute one or more algorithm(s) to automatically map structures of the MSC 108 to the CPN 110.

Constraints may be applied to the formal model to verify an operation of the service-based process and output a verified formal model (206). For example, the model verifier 150 may input the formal model (CPN) 110 and (relevant ones of) the policy constraints 126, and may determine whether the various available states of the CPN 110 are reachable with respect to the relevant constraints. In particular, the model verifier 150 may determine such goal reachability for a particular user or class of users, represented by the user 132 having the credentials 134. More generally, the verification may include anything from a general determination of whether the service-based process will work at all, to more specific determinations of whether specific sequences of services (or sub-sets of services) are allowable.

Executable code may be generated from the verified formal model for executing the service-based process therewith (208). For example, the code generator 154 may generate some or all of the executable code 112, e.g., in BPEL, for execution of an instance of the service-based process for the user 132 within the orchestration engine 114.

Figure 3:
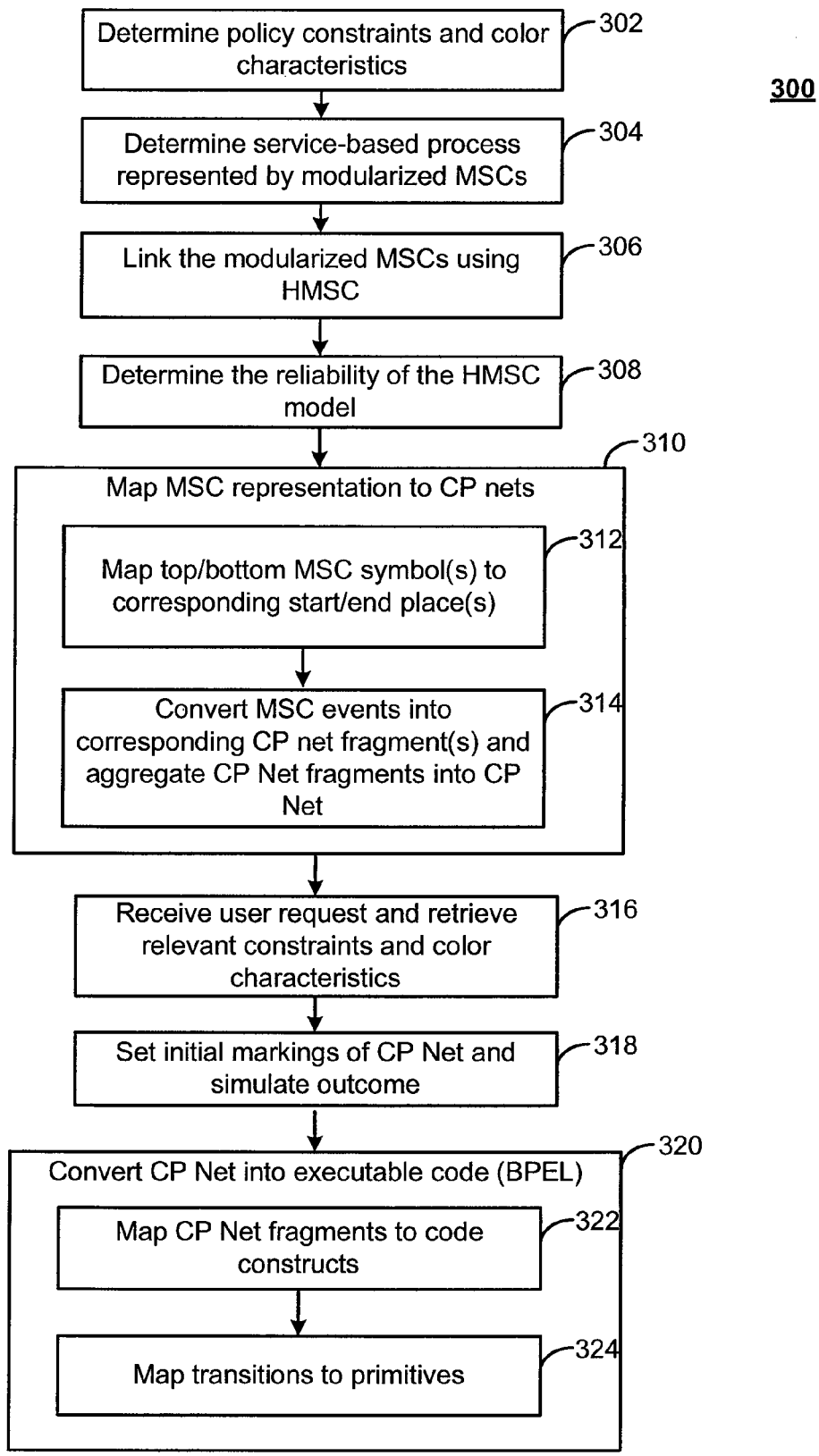
FIG. 3 is a second flowchart illustrating example operations of the system of FIG. 1.

FIG. 3 is a second flowchart 300 illustrating example operations of the system 100 of FIG. 1. FIG. 3 provides examples of more details in the example embodiment of FIG. 1 in which the diagrammatic representation 108 is a MSC and in which the formal model 110 is a CPN. Although FIG. 3 is illustrated as a sequential, ordered listing of operations, it will be appreciated that some or all of the operations may occur in a different order, or in parallel, or iteratively, or may overlap in time.

In the example of FIG. 3, policy constraints and color characteristics are determined (302). As described herein, these policy constraints, such as the policy constraints 126, may include constraints associated with potential service requesters such as the user 132 (and with associated credentials 134), or associated with the services 104, 106. As will be appreciated, some such constraints may be determined a priori and/or in advance of a composition of some or all of a WSP or other service-based process. Other such constraints will only be able to be determined once the services 104, 106 have been selected, or when a new user 132 (or new credentials 134) are added to the system 100 of FIG. 1.

In the example of the CPN 110, the color characteristics 142 may reference the representation of some or all of the constraints as colors in association with a place (e.g., the place 136) of the CPN 110. For example, the place 136 may be associated with the service 104, and the service policy constraints 128 may include a constraint that the service 104 is only accessible to requesters having credential "X." This constraint may be associated with a color (e.g., red) that is associated with the place 136. Meanwhile, the credentials 134 for the user 132 may be associated with either a token that is red (if the credentials 134 include the credential "X") or a hole that is red (if the credentials 134 do not include the credential "X"). Consequently, as described below with respect to FIG. 9, advancement of the associated token (or hole) through the CPN is indicative of whether the requester (e.g., the user 132) will be allowed to access a service (e.g., the service 104) associated with a given place of the CPN (e.g., the place 136).

A desired service-based process(es), such as a WSP, may be constructed as the diagrammatic representation 108, using modularized MSCs (304). That is, for example, the services 104 and 106 may be discovered and then represented in the MSC 108 using the modeling tool 144. The modularized MSCs may then be linked into a HMSC (306). As referenced herein, such a HSMC supports an abstraction of the MSC modules and serves as a guide for linking the modularized MSCs. For example, the HMSC may provide the sequence(s) in which the MSCs may be executed. Further examples of a HSMC are provided below with respect to FIG. 6. Then, a reliability of the HSMC may be determined (308), such as when the reliability calculator 146 is used to implement a reliability model in which reliability of the HSMC is expressed as a function of the reliability of the MSC modules and the frequency of utilization of those MSC modules.

The MSC (module(s)) may then be mapped to the CPN (310), e.g., using the model converter 148. Specifically, tops of MSC symbols may be mapped to start places of a CPN being constructed, while bottom MSC symbols may be mapped to end places of the CPN (312). Then, MSC events may be converted into fragments for the CPN, which may then be aggregated into the entire CPN net 110 (314). Specific examples of such mapping(s) are provided below, e.g., with respect to FIG. 7.

Once the CPN 110 is constructed as an example of a state-based model, then verification (e.g., goal reachability analysis) may be performed. For example, a user request may be received and relevant constraints and color characteristics for that user may be determined (316). For example, as referenced above, the model verifier 150 may access the credentials 134 for the user 132, the policy constraints 126, and the color characteristics 142.

Then, initial markings of the CPN 110 may be set and possible outcome(s) for the user 132 may be simulated (318), e.g., using the simulator 152. For example, as referenced above and as illustrated in detail below with respect to FIG. 9, the color characteristics for each place of the CPN 110 may be determined based on the policy constraints 126. Then, the credentials 134 for the user 132 may each be represented as either tokens (representing possession of the necessary credential) or holes (representing lack of possession of the necessary credential) having a corresponding color.

In practice, the CPN 110 as a whole may represent various states (places) at which associated service(s) (or functions of services) are illustrated. During verification and simulation for the user 132, the techniques described herein may be used to determine, e.g., prior to execution of the WSP, whether and to what extent the particular user 132 may access the WSP for execution. For example, and continuing the example above, if the color "red" is associated with a policy constraint and with a particular place of the CPN 110, and if the user 132 is associated with a red token, then the user 132 may be allowed to access the particular place. On the other hand, if the user 132 is associated with a red hole, then the user 132 may not be allowed to access the associated place (e.g., service), so that the user 132 may either find an alternative solution or may decide to proceed without accessing the blocked place (service).

Once the user 132 is satisfied with the simulated outcome, or is otherwise ready to proceed to execution of the service-based process, the CPN 110 may be converted into executable code, such as BPEL (320). For example, fragments of the CPN 110 may be designated and matched to pre-designated, standardized BPEL code constructs (322). Within these CPN fragments, transitions of the CPN 110 (e.g., the transition 138) may be marked for, or mapped to, BPEL primitives (324) associated with certain actions needed for implementing a service-based process (e.g., invoking of a web service, or receiving a message from a web service). In this way, specific BPEL structures may be populated and constructed. More specific example(s) of conversion(s) between the CPN 110 and the executable (BPEL) code 112 are described below, e.g., with reference to FIG. 10. In general, it may be appreciated that it is possible in some cases that the conversion may occur completely automatically, while in other situations the resulting BPEL constructs/primitives/code sections may need to be modified and/or joined together, e.g., by one or more additional algorithms and/or by the user 132.

Figure 4A:
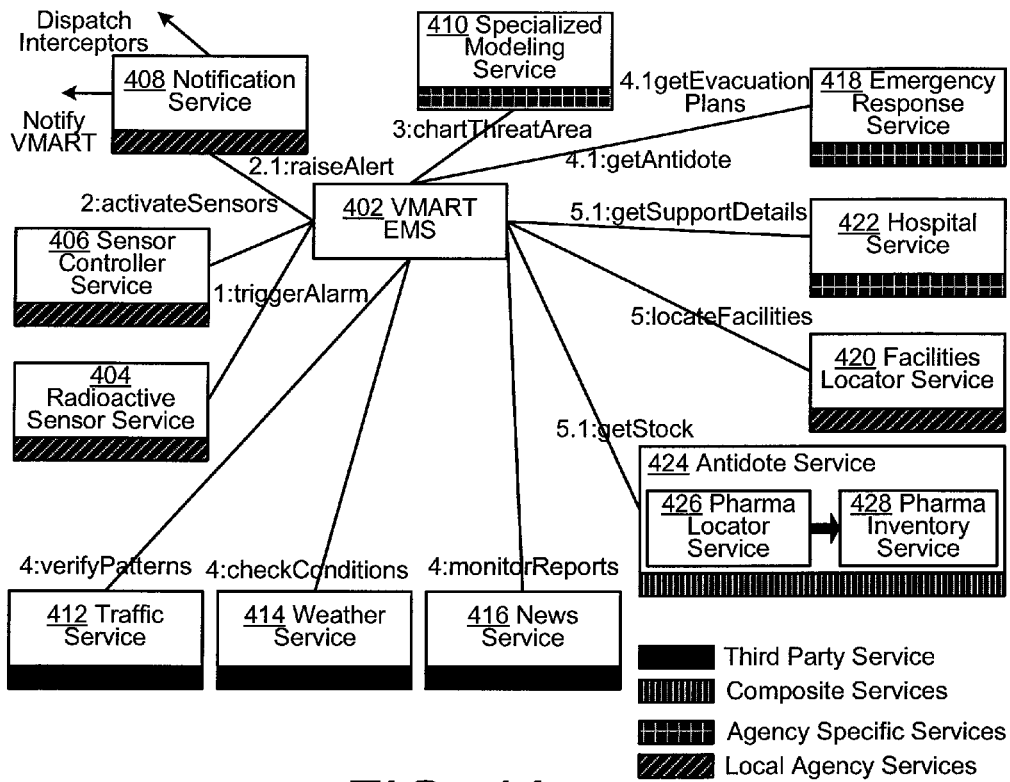
FIG. 4A is a block diagram of an example scenario benefiting from service-based processes implemented using the system of FIG. 1.

FIG. 4A is a block diagram of an example scenario benefiting from service-based processes implemented using the system 100 of FIG. 1. Of course, FIG. 4A merely provides a non-limiting example, and virtually any service-based process may be constructed using the techniques described herein.

FIG. 4A provides a scenario in which the service-based process relates to a security application, such as a security application for responding to radiological threat event. For example, a Virtual Multi-Agency Response Team Emergency Management System (VMART EMS) 402 may be constructed based on services 404-428, and/or other services not specifically shown. That is, a number of agencies or other entities, such as governmental entities, fire departments, hospitals, or police departments, may interact to respond to the threat event.

For example, as shown, radioactive sensor service 404, sensor control service 406, notification service 408, and facilities locator service 420 may represent local agency services which detect and provide an initial response (e.g., interceptors or notifiers) to a potential threat, e.g., by triggering an alarm, activating various sensors, raising an alert, or locating relevant facilities for responding to the threat. Agency specific services, such as a specialized modeling service 410, or emergency response service 418, or hospital service 422, may be used, for example, to set evacuation plans, provide an antidote, or otherwise provide support details for responding to the threat. Third party services such as a traffic service 412, weather service 414, and news service 416 may be used, for example, to verify traffic patterns for an evacuation, check weather conditions for spread of the radiological substance, or monitor news reports regarding current conditions. Finally in this example, composite services, representing pre-combined services which interact together to provide a result, may include an antidote service 424 made up of atomic services such as a pharma locator service 426 and a pharma inventory service 428, for detecting and obtaining desired stock for creating an antidote.

Thus, in example scenario(s), a first instance of information sharing and collaboration may involve the coherent integration of operational protocols from multiple agencies covering local, state, and federal jurisdictions and employing varied resources at their disposal. As shown, this may be accomplished via an integrated system of systems utilizing assets at the local, state and federal levels. The integrated system is based on a service-oriented architecture wherein the participating agencies dispense their responsibilities utilizing functionality provided by local as well as third party web services, as described above and shown in FIG. 4A.

An example scenario may thus unfold as follows. Once a sensor is triggered, a secondary inspection will be performed. If the second sensor identifies that the source could be a threat, an alert is generated and sent to the local emergency operations center. If the second sensor cannot identify the source, raw data or spectra will be sent to scientist/experts at the federal level for analysis and verification. Additional data to be also sent to assist in the verification process may include, for example, environmental data, imagery, and background readings.

If a detected source has been verified and poses a real threat, an emergency situation may be assumed and an alert may be published to the appropriate local, state, and federal tiers based on the severity of the threat via VMART EMS 402. This is illustrated in steps 1 through 3 of FIG. 4A. Thus, as shown and described, local, state and federal assets will be deployed in response to the emergency. Emergency protocols and appropriate response actions will be activated at each of the agencies, as shown in steps 4 through 5 of FIG. 4A.

Figure 4B:
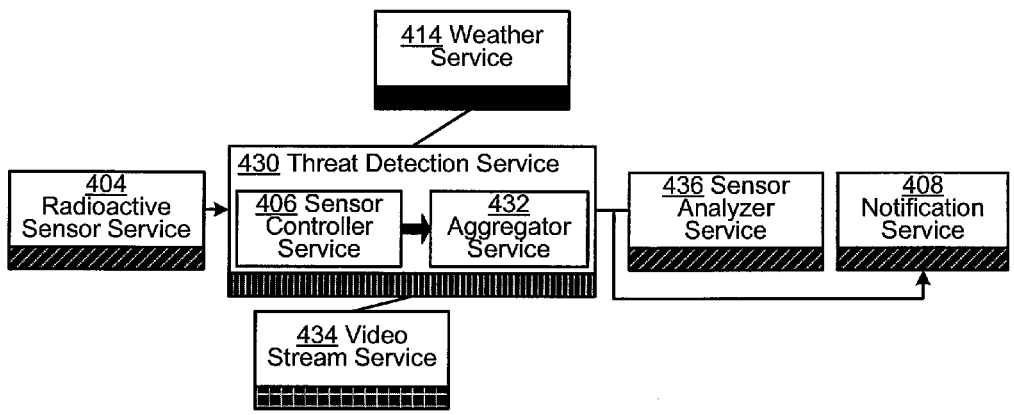
FIG. 4B is a block diagram of a Web Services Process (WSP) used in the example scenario of FIG. 4A.

Another aspect, as part of VMART EMS 402, involves considering constraints governing resources (web services) that are available to different participating agencies. FIG. 4B illustrates part of the example scenario as a WSP that avails the participants of VMART EMS 402 with environmental data, imagery, and background readings resources. As shown, these services may include services already illustrated in FIG. 4A, as well as other services, such as a composite threat detection service 430 (which includes a sensor control service 406 and an aggregator service 432), as well as a video stream service 434 and a sensor analyzer service 436.

The availability of the resources may be regulated by pre-defined policy constraints, such as the policy constrains 126 of FIG. 1. For example, the local fire department (acting as the user 132 with credentials 134) may not have access to onsite video stream from the video stream service 434. Also the collaborating state transportation agency may not have rights to make use of actual sensor data for further analysis and modeling, whereas the participating federal agency may be authorized to use both of these resources. Thus, it will be appreciated that the interplay of service policies and subsequent services available to the requestor may determined using goal reachability analysis, as described herein.

The examples of FIGS. 4A and 4B illustrate that a specification of a WSP to represent such scenarios may be difficult or challenging. For example, here, the scenario represents a complex WSP that includes several interacting detailed processes involving multiple agencies and different types of resources, e.g., the threat detection and verification by the Threat Detection Service (TDS) 430. The TDS 430 is made up of multiple interacting component services 406, 432, so that it may be a challenge to provide a methodology that makes it convenient for a domain expert/system user, who is not an expert in process specification, to represent the specification of tasks detailing protocol behavior in terms of a set of related scenarios. As already described, however, such a scenario may be expressed as a MSC showing a sequence of interactions describing how the system reacts to the stimuli from its environment, as described below with respect to FIG. 5. The system 100 of FIG. 1, or similar systems, may be used to provide such interaction-based models, while also providing methods and tools that confirm valid invocation ensuring goal reachability, based on user credentials, of relevant web services that achieve the desired functionality to the tasks of the process.

Figure 5:
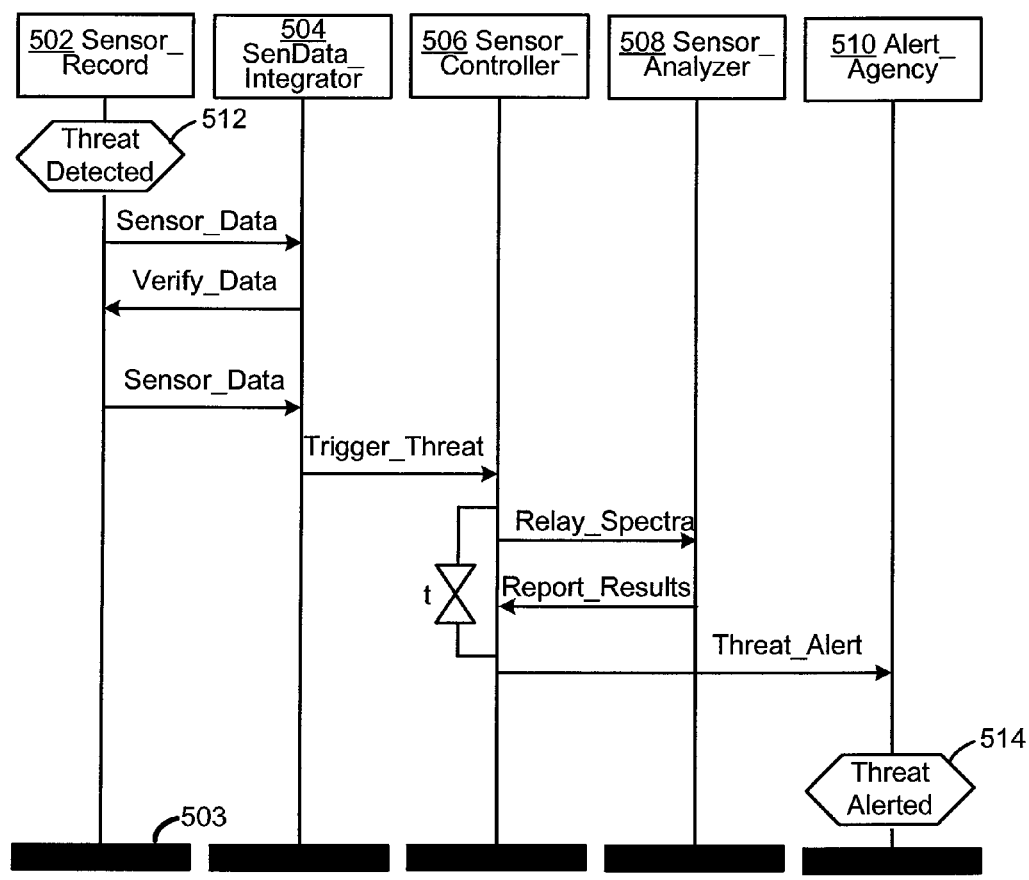
FIG. 5 is a block diagram of a message sequencing chart (MSC) illustrating an interaction-based diagrammatic representation of a service of the WSP of FIG. 4B.

FIG. 5 is a block diagram of a message sequence (MSC) chart illustrating an interaction-based diagrammatic representation of a service of the WSP of FIG. 4B. More specifically, FIG. 5 represents the sensor controller service 406 of FIGS. 4A and 4B.

By way of background, a basic MSC may be considered a tuple, M=(E, P, g, h, m, <), where E is a finite set of events, P is a set of processes, g is a mapping that associates each event with a process, h is a mapping that associates each event with a type (send or receive), m is a bijective function that maps send events to the receive events, and < is a partial order relation between events such that: $\forall e \in E: h(e)=send \Rightarrow e<m(e)$ (i.e., a send event must be ordered before the corresponding receive event). As referenced above, MSC is a member of a large class of specification techniques, e.g., UML Interactions, that utilize diagrammatic representation for process specification. MSC is a language that considers the graphical syntax tightly coupled to the domain concepts, and generally has more formally defined semantics, which may be useful for conversions to the formal model 110, such as the CPN 110.

Thus, in FIG. 5, as just referenced, the MSC for a simplified version of the sensor controller service 406 is shown, which may be constructed using the modeling tool 144 of FIG. 1. Generally, as shown, a sequence of events is considered in which a threat is detected and consequently an alert is issued. More specifically, a sensor record element 502 detects a threat 512 based on an exceeding of a sensor threshold, which induces sending a sensor data message that includes the sensor data to a sensor data integrator element 504. The sensor data integrator 504 in turn triggers a verify_data message for the data to be verified, e.g., with the help of a mobile sensor. The verified sensor data is then messaged back to the sensor data integrator 504 in another sensor_data message.

The sensor data integrator 504 passes the indication of a threat as a trigger_threat message to the sensor controller 506. The sensor controller 506 relays the inconclusive spectra for further analysis to a sensor (spectral) analyzer 508 as part of a relay_spectra message. The spectral analyzer 508 messages back to the controller with a report_results message, and also logs the results with a message to the environment. The sensor controller instance is associated with a timer "t" that sends out the threat alert as threat_alert message without the specific spectral analysis results. If the spectral results are obtained within the subsequent time out signal of the timer, the controller 506 issues a threat alert combined with the local action of gathering additional information that includes associated environmental data and imagery. The threat alert 514 is then issued to the local agency, and a bottom 503 (end) of the MSC is reached.

Figure 6:
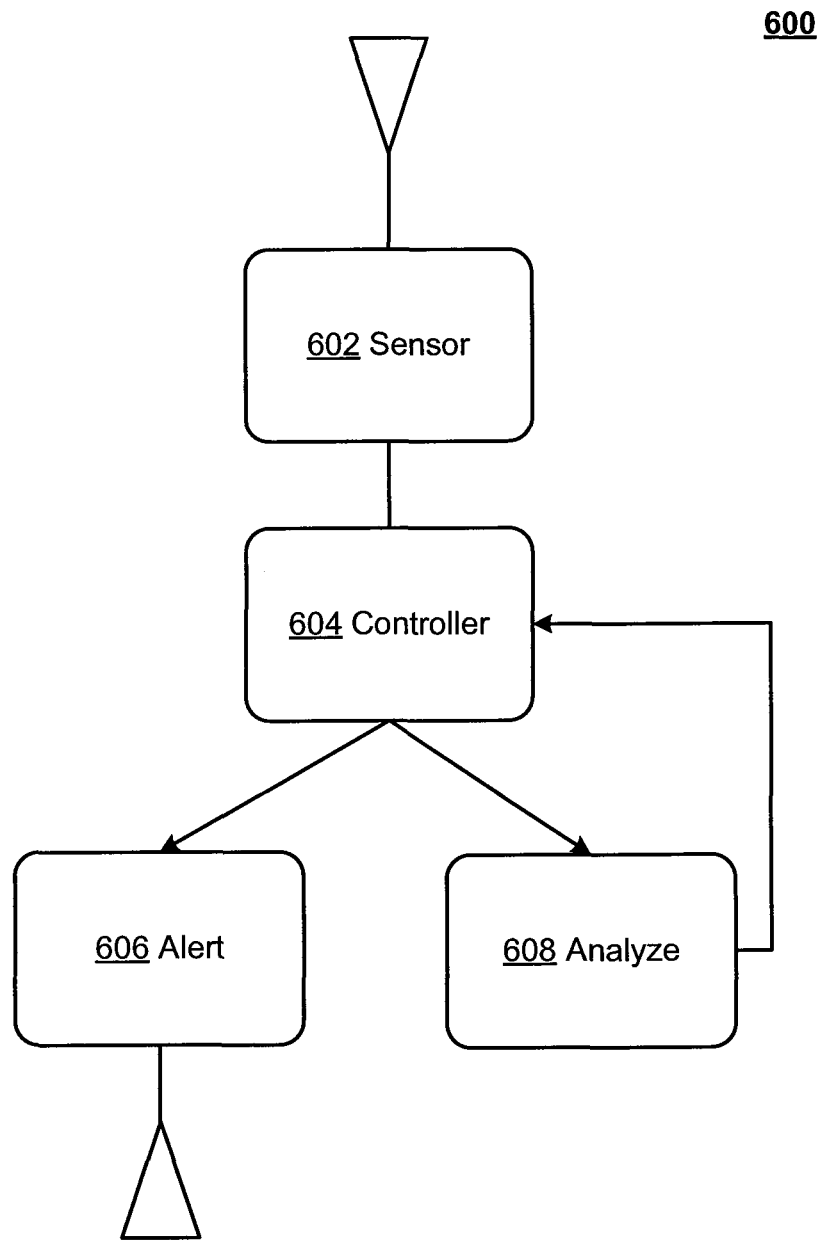
FIG. 6 is a block diagram of a high level MSC (HMSC) illustrating a combination of MSCs such as the MSC of FIG. 5.

FIG. 6 is a block diagram of a high level MSC (HMSC) illustrating a combination of MSCs such as the MSC of FIG. 5. In general, HMSC supports the abstraction of the MSC specifications and services as a guide for linking modularized MSCs. HMSC specifies the sequences in which the MSCs can be executed. The controller 604 in the HMSC depicted in FIG. 6 is represented by the MSC 500 presented in FIG. 5. Similarly, the sensor 602, alert 606, and the analyze 608 components would have corresponding MSCs detailing the actual associated process(es). As illustrated in FIG. 6, the upside down triangle indicates the starting point.

Thus, at first the sensor 602 communicates with the controller 604. Following this, the controller 604 further analyses 608 the data or alternatively issues the alert 606. The end point is indicated by the triangle at the end. The final step is to compute the reliability of this model, e.g., using the reliability calculator 146. As referenced above, various approaches may be used, e.g., an approach based on the Markov reliability model that expresses system reliability as a function of the reliability of the components and the frequency of utilization of those components.

Figure 7:
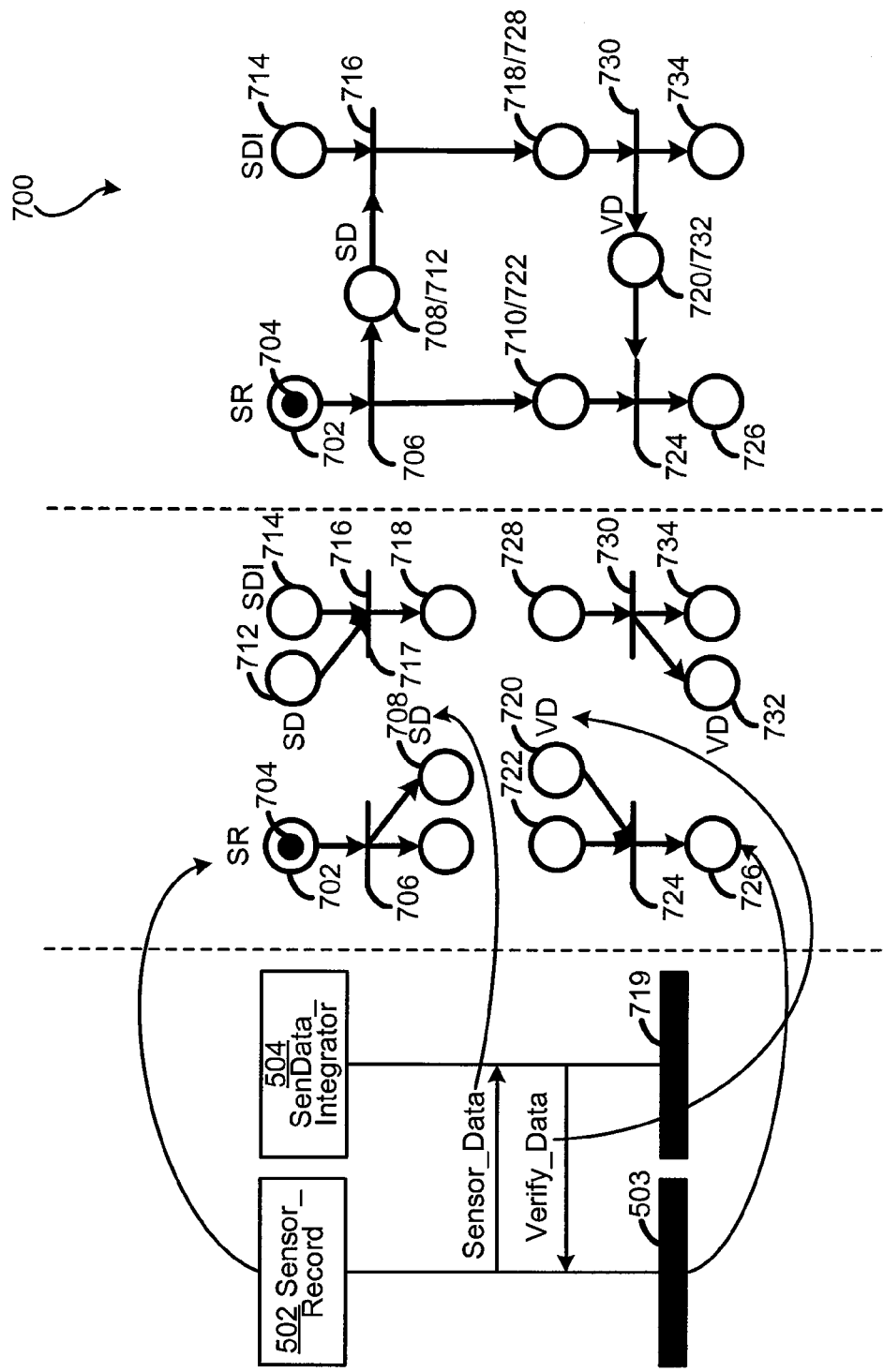
FIG. 7 is a block diagram of a conversion of a portion of the MSC of FIG. 5 into a Colored Petri Net (CPN) fragment.

FIG. 7 is a block diagram of a conversion of a portion of the MSC 500 of FIG. 5 into a Colored Petri Net (CPN) fragment 700, e.g., as part of the CPN 110 of FIG. 1, and perhaps implemented using the model converter 148. As referenced above, colored Petri nets provide an example of a state-based formal model which may be verified against policy constraints, such as the policy constraints 126.

More specifically, Petri Nets present an explicit description of both the states and the actions of the system simultaneously. The states of a Petri Net are represented by places and the actions by transitions. Each place contains a set of markers called tokens. As referenced, CP Nets extend Petri Nets by allowing the use of tokens that carry data values, thereby providing a concise method for modeling and analyzing complex systems. CP Nets combine the strength of Petri Nets that provides the primitives for describing synchronization of concurrent processes with programming languages that provides the primitives for defining data types (color sets) and manipulating data values.

Figure 8:
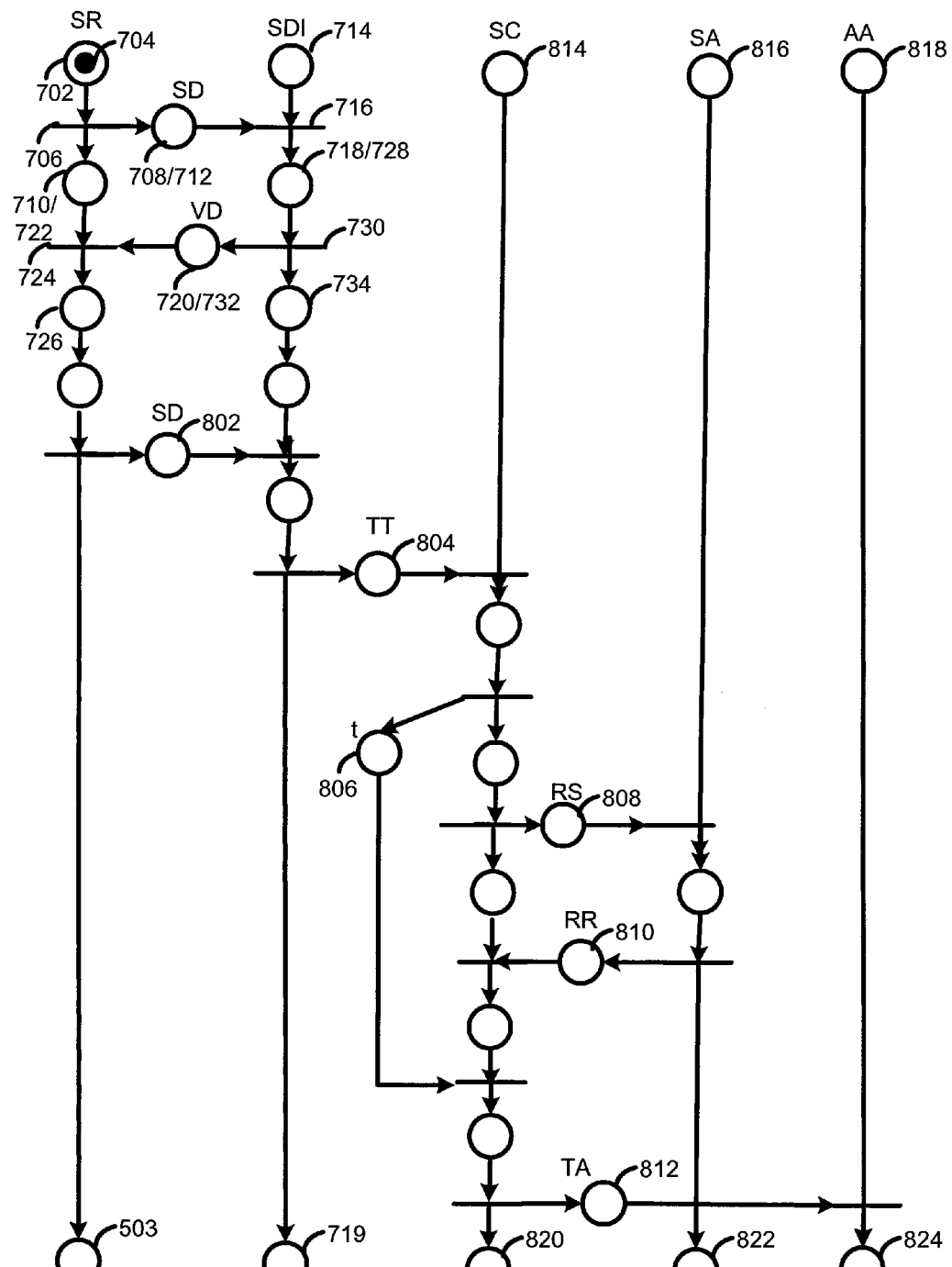
FIG. 8 is a block diagram of a CPN constructed using CPN fragments such as the CPN fragment of FIG. 7.
Figure 9:
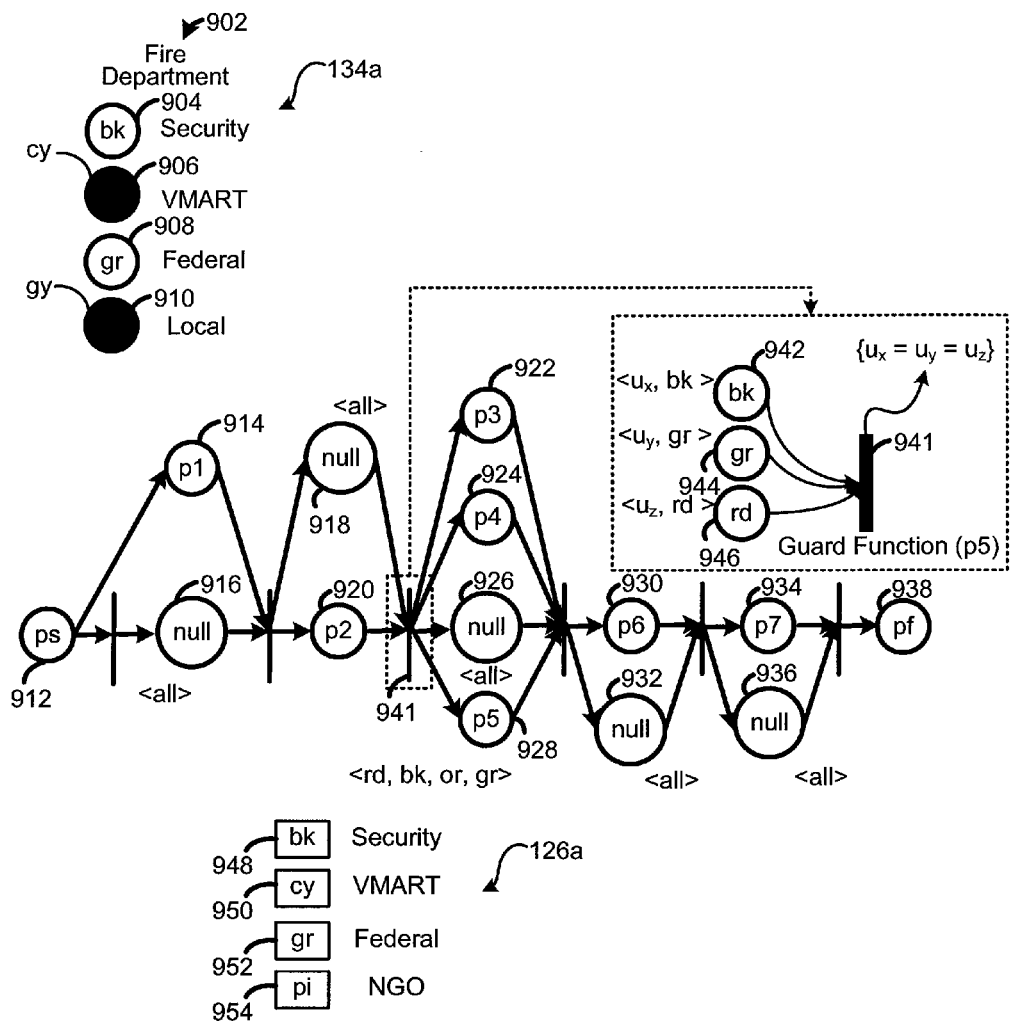
FIG. 9 is a block diagram illustrating policy constraints for a WSP that has been represented by a CPN such as the CPN of FIG. 8.

In the example of FIGS. 7-9, two types of tokens are used: a regular token (represented as a filled dot) and a hole (represented as a circle). When a token enters a place, it is said to be available after the time of interval of the place has elapsed. On the other hand, when a hole enters a place, it becomes available as soon as it enters. As far as the dynamic behavior of the Petri net is concerned, tokens and holes behave the same way.

Formally speaking, A CP Net may be expressed as a tuple $N=(\Sigma, P, T, A, N, C, G, E, I, M, H, D, i, l, e)$, satisfying the following requirements: $\Sigma$ is a finite set of non-empty types called color sets (or simply colors), P is a finite set of places, T is a finite set of transitions, A is a set of arcs such that: $P \cap T = A \cap P = A \cap T = \emptyset$, N is a flow relation defined from A into $(P \times T \cup T \times P)$, C is a color function mapping each place $p \in P$ into a color from $\Sigma$, G is a guard function. It may be defined from T into expressions such that: $\forall t \in T$, Type(G(t))= B $\wedge$ Type(V ar(G(t))) $\subseteq \Sigma$. E is an arc expression function. It is defined from A into expressions such that: $\forall a \in A$, Type(E(a))=C(p(a))MS $\wedge$ Type(Var(E(a))) $\subseteq \Sigma$, where p(a) is the place connected to a 1. I is an initialization function mapping each place $p \in P$ into a multiset over C(p), $M=P \rightarrow 2^\tau$ is the marking, there exists a set {token, hole} of types, and a type function H, such that $\forall y \in m(p)$, H(y) $\in$ {token, hole}, D is a duration function, $D: P \rightarrow \Gamma$ where $\Gamma = \{\alpha \in \acute{R} \; \acute{R}$ represents the set of all real numbers, $|\alpha \geq 0\}$, i, l, e are labeling functions.

The above definition states that each marking belongs to either of the two types, token or hole, and is associated with a color (or type) which is defined in the color set Σ. Each place is associated with a color set (i.e., denoted as C(p)), which specifies the set of allowable colors of the tokens (holes) to enter the place.

Given a transition t, its input and output set of places may be denoted by •t and t• respectively. A transition t is enabled only if all of its input places p are marked, and the tokens (holes) are available. An enabled transition fires. As a result, when more than one input place exists, the transition fires after the maximum duration of all the input places has elapsed. Upon firing, t consumes all the tokens (holes) from each of its input places p and deposits them into each of its output places, as their color sets permit.

In the example of FIG. 7, a fragment of the MSC 500 of FIG. 5 is converted or mapped into a CPN fragment 700, following Algorithm 1, below. Specifically, as shown, MSC events may be represented by CP Nets by mapping the top and the bottom symbol of the MSC fragment to a start and end place, respectively, of the CP Net fragment. MSC events (e.g., messages) may be associated with transitions of the CP Net fragment. Additional start and end places may be added to serve as intermediate or fusion places for later combinations of the created CP Net fragments into a cohesive CP Net; specifically, an additional place may be added to start places for receive events (e.g., receipt of message(s)), while an additional place may be added to end places for send events (e.g., sending of message(s)).

For example, the sensor record 502 as a MSC top symbol may be mapped to a start place 702, which contains a token 704 if it assumed that no messages have yet been passed. A transition 706 is defined between the start place 702 associated with the sensor_data record, and an end place 708 which is created based on a mapping of the sensor_data message from the sensor record 502. Since this is a send event, an additional place 710 is added that provides for completeness of the CP Net fragment and which services as an intermediate or fusion place for combining CP Net fragments, as described in more detail below. In this way, the sending of the sensor_data message from the sensor record 502 to the sensor data integrator 504 may be represented.

The receiving of this sensor_data message may be represented by start place 712 and start place 714, corresponding to the sensor record 502 and the sensor data integrator 504. A transition 716 leads to an end place 718 corresponding to MSC bottom 719. Then, receipt of the verify_data message may be associated with a start place 720 and an additional start place 722, which lead to a transition 724 and an end place 726. Finally, sending of the verify_data message may be associated with a start place 728, transition 730, an end place 732, and an additional (intermediate or fusion) end place 734.

Then, in the CP Net fragment 700, the end place 708 and the corresponding start place 712 are fused into place 708/712, while similarly the start place 720 and the end place 732 are fused into the place 720/732. Place 710 and place 712 are fused into place 710/712, and place 718 and place 728 are fused into place 718/728.

In this way, as described, the MSC fragment 500 may be converted to the CP Net fragment 700. A formal statement of an example algorithm for performing this mapping is provided below with respect to Algorithm 1.

---

Algorithm 1
Algorithm: map MSC to CPNet

---

Input: Message Sequence Chart (MSC) M with events $E_i$ E
Output: Colored Petri Net (CP Net), N
1: begin
2: for each MSC $m_i$ ∈M do
3:   map top of MSC to start place
4:   map bottom of MSC to end place
5: /* map e from transitions to MSC events E */
6: map places and transitions to instance names
       i:PUT→I, e: T→E ; P→{begin, end}∪C.
7: map controlling labels to message identifiers
8:/* mapping send and receive events */
9: create additional place to start place for receive event, $E_r$.
10: create additional place to end place for send event, $E_s$.
11: Fuse start place of $E_r$ with end place of subsequent $E_s$
12: sequentially append instances' transitions in the MSC
13: end for
14: return N
15: end

---

FIG. 8 is a block diagram of a CPN, such as the CPN 110 of FIG. 1, constructed using CPN fragments such as the CPN fragment 700 of FIG. 7. As shown, FIG. 8 includes the above-referenced start/end places and transitions. FIG. 8 also includes corresponding CPN fragments associated with the messages of the MSC 500 of FIG. 5. For example, FIG. 8 includes a place 802 corresponding to the sensor_data message of FIG. 5, a place 804 corresponding to the trigger_threat message of FIG. 5, a place 806 corresponding to the timer of FIG. 5, a place 808 corresponding to the relay_spectra message of FIG. 5, a place 810 corresponding to the report-results message of FIG. 5, and a place 812 corresponding to the threat_alert message of FIG. 5. Further, FIG. 8 includes start places 814, 816, 818 corresponding to top elements 506, 508, 510 of FIG. 5, and end places 503, 719, 820, 822, 824 representing corresponding bottom places of the MSC 500 of FIG. 5. Remaining places in FIG. 8, not specifically labeled, may be understood to be generated in association with implementation of Algorithm 1, e.g., may correspond to the fusion places described above for combining the CPN fragments.

FIG. 9 is a block diagram illustrating policy constraints for a WSP that has been represented by a CPN such as the CPN of FIG. 8. The policy constraints, for example, may represent or include the policy constraints 126 of FIG. 1. Such policy constraints associated with a WSP may be expressed as follows: p=({$w_1$, ... $w_n$}, S) where each $w_i$ is a component web service of the process flow p and S is a set of associated policy constraints denoted as S={SP, CP} where SP denotes the associated service policy constraints and CP denotes composition policy constraints.

The service policy constraints 128 (sp) may be specific to each individual component web service of the composed process flow. The sp 128 utilizes the credentials 134 of the service requestor (e.g., the user 132) to determine the access to specific web service or a set of web services, e.g., the services 104, 106, or the services of FIGS. 4A, 4B. The credentials 134 of the service requestor may include requestor attributes that are used for access control. These attributes, for example, may be as simple as the name of the service requestor, e.g., the name and function of a requesting agency, or can be the role performed by the service requestor, e.g., a collaborating state agency, such as a police department, which may be delegated a response role in a VMART.

A service policy constraint on a component web service may be specified as a set of credentials and/or a set of specific input parameters required for invoking the service. By utilizing credentials, it is possible to enforce critical security policies such as, for example, the streaming video feed (e.g., the service 434 of FIG. 4B) is allowed to be viewed only by agencies assuming a security role in a VMART.

More formally, a service policy may be stated in terms of the conditions and contexts under which a particular policy becomes relevant; for example: SP={$sp_1$, ..., $sp_n$} where sp=[{$cr_1$, ..., $cr_n$}, {$i_1$, ..., $i_n$}] denotes the set of all credentials relevant for the composed process flow. Each service requester (sr) possesses a set of credentials denoted as $sr_{cr}$. A service policy constraint can be expressed, for example, as (a) each component web service $w_i$ of p is associated with a set of credentials, denoted as $(w_i)_{sp}$, and/or 2) a set of component web services $(w_i, w_j, ...)$ is associated with a set of credentials, denoted $(w_{ij})_{sp}$. The first set policy constraints is to specify that a service requester must possess $(wi)_{sp}$ to invoke $w_i$. Thus, when a component web service is requested by a service requestor sr (e.g., the user 132), requestor credentials 134 are checked against the service policy constraints 128, for $w_i$ to sr only if $(w_i)_{sp} \subseteq sr_{sp}$. The second set of service policy constraints is to specify that the service requester 132 must possess $(w_{ij})_{sp}$ to invoke $(w_i, w_j, ...)$ together, e.g., viewing an onsite streaming video along with the relevant sensor readings may require a higher set of credentials.

Composition policy constraints (cp) 130 may include service type constraints, inter-service constraints and security constraints, specific to each individual component web service of the composed process flow. The sp 128 may make use of the characteristics of the component web service to determine the execution of specific web service or a set of web services. The formal definition of the composition policy constraints for a composed process flow may be expressed as follows: CP={$cp_1$, ..., $cp_n$} where cp=[{$st_1$, ..., $st_n$}, {$se_1$, ..., $se_n$}] denotes the set of all execution characteristics relevant for the composed process flow.

Specific examples of the composition policy constraints thus may include service type constraints and inter-service execution constraints. For example, service type constraints may specify the requirements on the type of web service, e.g., atomic or complex web service, to be rendered. More formally, service type constraint may be defined as $(w_i)_{st}$ for p. For example, additional weather reporting services may be requested for as an atomic web service. Meanwhile, inter-service execution constraints may specify the various temporal relationships to be adhered to by the component web services when executing the process flow. The various inter-service execution constraints among the component web services may be modeled utilizing interval temporal logic.

Thus, FIG. 9 illustrates a CP Net 900, similar to the CP Net of FIG. 8, which may implement verification and goal reachability analysis using the policy constraints 126, e.g., relative to the credentials 134. Such verification and simulation may be provided, for example, by the model verifier 150 and simulator 152 of FIG. 1.

In FIG. 9 it is assumed that the user 132 includes a fire department participating in the VMART of FIG. 4A. The fire department 902 is associated with a set of user credentials that are expressed using color characteristics 142. In particular, a black ("bk") hole 904 shows that the fire department 902 does not posses the referenced security clearance. A cyan ("cy") token 906 illustrates that the fire department does possess the referenced VMART credential(s). A green ("gr") hole 908 illustrates that the fire department 902 does not possess the referenced federal credential, while a gray ("gy") token 910 illustrates that the fire department does possess the referenced credential(s) as a local agency.

As described herein, these credentials 134*a* as examples of the credentials 134 may be passed through the CP Net 900 of FIG. 9, so that implementation of the CP Net 900 as described herein automatically illustrates and determines an extent to which the fire department 902 may use or access the component services of the represented service-based process (e.g., WSP).

In FIG. 9, the CP Net 900 includes a start place (ps) 912, which leads to a place (p1) 914 and a null place 916 that are in parallel. Similarly, a place (p2) 920 and a null place 918 are in parallel, while places (p3) 922, (p4) 924, (p5) 928 are in parallel with a null place 926. Continuing, a place (p6) 930 is in parallel with a null place 932, while a place (p7) 934 and a null place 936 are in parallel before a final place (pf) 938 is reached.

In general, it may be appreciated that tokens (representing sufficient credential(s)) or holes (representing insufficient or lacking credential(s)) may thus advance through the CP Net 900. If a service requester, such as the fire department 902, were to possess all of the necessary credentials to satisfy all applicable constraints, then the service requestor may simply advance through the CP Net 900 through places 912, 914, 920, 922/924/928, 930, 934, and 938. In practice, however, if the requestor is missing a credential associated with a given place (service), i.e., has a hole instead of a token associated with the credential(s) in question, then the service requestor (i.e., associated holes) may advance through one or more of the null places 916, 918, 926, 932, and/or 936. It may be appreciated from the above description that in this sense the null places 916, 918, 926, 932, and 936 may be analogous to the intermediate or fusion places that were included during the conversion of the MSC to the CP Net.

Since a number of different service requestors (users) may advance tokens through the CP Net 900 simultaneously, a guard function, such as the guard function 940, may be included, in order to ensure that tokens entering a given transition (e.g., the transition 941) are identified as being associated with a single, specific user, such as the fire department 902. That is, as shown and as described in more detail below, the guard function 940 may ensure that user holes (or tokens) 942, 944, 946 are different holes/tokens associated with a same user. For example, the user holes (or tokens) may be associated with the fire department 902.

In FIG. 9, each of the places may be associated with corresponding policy constraints. For sake of clarity and brevity, the example of FIG. 9 illustrates such constraints 126*a* only in association with the place (p5) 928. In particular, FIG. 9 illustrates that the place (p5) 928 is associated with a security constraint 948, a VMART constraint 950, a federal constraint 952, and a NGO constraint 954. Consequently, tokens associated with a given user/service requestor much match the constraints 126*a* in order for that user to implement the service associated with the place (p5) 928.

In the example of FIG. 9, however, it may be seen that the (black) hole 904 implies that the fire department 902 does not satisfy at least the required (black) security constraint 948. Similarly the (green) hole 908 shows that the fire department 902 is not a federal agency and therefore does not satisfy the (green) constraint 952.

As a result, for example, the simulator 152 may simulate or illustrate the access of the fire department 902 to/through the CP Net 900, and may thus illustrate that the fire department 902 may not access the service/place 928 (e.g., may show the CP Net 900 as part of a graphical user interface, and may show the place 928 'grayed out' or otherwise unavailable.

As a practical matter, an inability of a service requester such as the fire department 902 may have various outcomes.

For example in some cases the fire department may be prevented from using the service-based process (e.g., WSP) at all. In other examples, the fire department may simply lose access to a particular service, such as when the place 928 is associated with a video streaming service such as the service 434, so that the fire department 902 may implement the overall WSP, but without benefit of a video feed/stream.

Thus, FIG. 9 illustrates how CP Nets represents the WSP and the different types of constraints associated with it in a uniform way. In addition, a dynamic manifestation of the WSP can be accomplished in an automatic way, thereby allowing for goal reachability analysis along the way. As described, the service policy and composition policy constraints may be represented as color sets associated with the places of the CP Net, where colored tokens represent, for example, the credentials and the service type and inter-service execution constraints of the service requestor, and colored holes represent the absence of the characteristics or credentials.

More specifically, and more formally, a time interval associated with a place represents the temporal constraint associated with inter-service execution policy. The synchronization constraints among the different component web services may be represented in the Petri net model itself by appropriately connecting the places to the transitions. Similarly, tokens also may be associated with one of the colors in $\Sigma$, e.g., if a place is associated with a color set={federal}, and a time interval 25, which indicates the temporal constraint in terms of the time for which the service is to be invoked. This service will be invoked only if a token with color federal enters this place. On the other hand, if a hole with color federal enters, the service will not be invoked.

In some examples, three distinct color sets may be used: $\Gamma$, $\Lambda$, and $\Omega$ such that $\Gamma 520 \wedge \Omega = \Sigma$ and $\Gamma \cap \Lambda \cap \Omega = \emptyset$, where $\Gamma$ denotes interservice execution characteristics, $\Lambda$ the different types of services and $\Omega$ the different types of credentials. For example, to determine the color set $\Gamma = \{\gamma_1, \gamma_2 \ldots\}$, a distinct color may be assigned for each interservice execution characteristic. Similarly, the color sets for $\Lambda = \{\lambda_1, \lambda_2 \ldots\}$, may be selected and assigned a distinct color for each service type. This procedure may be repeated for $\Omega = \{\omega_1, \omega_2 \ldots\}$, to assign a distinct color for each credential. Each component web service $w_i$ in the WSP may be represented by a place $p_i$, where the color set of $p_i = \{\gamma i1, \gamma_{i2}, \lambda_i, \omega_{i1}, \omega_{i2}, \ldots\}$. The interservice execution characteristics required are represented as tokens of the assigned color in $\Gamma$, the service type is represented as tokens of the assigned color in $\Lambda$, and the security credentials of the service requestor intending to invoke the service as tokens of the assigned colors in $\Omega$. The tokens and holes into $p_{initial}$ may be set such that the total number is equal to the number of distinct colors used. A guard function, G, such as the guard function 940, may be attached to a transition node to provide a binding, for firing in the enabled transition node set, for the same user. That is, if the guard function of the enabled transition is evaluated to be true to taking action, the transition is activated. The action of the activated transition may be fired and pass the tokens from its entering places to its outgoing places. For example, in FIG. 9, only the transition node will be fired where in user $u_x = u_y = u_z$. The request is checked by the guard function 940, which evaluates to true if it has tokens corresponding to the same users, e.g., <$u_x$, bk>, <$u_y$, gr> represent the credentials security and federal associated with the same user, as illustrated in FIG. 9. The guard function 940 also may be used to enforce that users with inadequate tokens are not able to invoke the service.

As already described, FIG. 9 illustrates the policy constraints such that each place, in FIG. 9, is represented with a set representing the service policy constraints. For example, as already described, w(p5)=<rd, bk, or, gr> from the credential set of {bk, cy, gr, pi}. This dictates that the component web service for place (p5) 928 may be invoked by an agency in a security role {bk} and at the federal level {gr}. {rd} represents an atomic web service, characterizing its interservice execution constraint. The credentials and characteristics required are represented as tokens and absence of them is represented as holes. The initial places are marked with these to start with. For example in FIG. 9, as already described, the service requestor (fire department 902) is not performing a security role at the federal level and therefore the initial marking contains holes for colors {bk} and {gr}.

Within a constraint type, one constraint property can inherit the properties of others, such as the credential {yl} (Fire Department) inheriting the property of the corresponding {cy} (VMART). The higher level credential may then be represented with a color set that includes all the lower level credentials. For example for the fire fighter responder credential may be represented with two tokens {yl, cy}. The CP Nets representing the WSP may be designed in such a way that, when it is inserted with the tokens and holes that reflect the credentials and characteristics into the initial place, it reflects the specific goal reachability of the composed WSP. For example if a service requestor's credentials are and characteristics are health department, member of VMART as a local agency, requiring atomic service, time duration 25, and no access to critical security components, then with this marking, holes will be entered in places p4 and p5, thus making these component web services inactive, and therefore, these will not be invoked.

The goal reachability analysis of the process, thus, involves the creation of initial markings for a process run to check for consistency and accuracy of execution. Thus, solutions may be provided with respect to reachability analysis, as well as for checking for liveness and existence of deadlocks, assuming a finite domain. The reachability problem pertains to deciding if a marking M of N is reachable for a given net N. Reachability analysis for a given process ensures that the process does not reach an unsafe state. An unsafe state pertains to all states that do not yield the minimum output as desired by the service requester.

Thus, in sum with respect to FIG. 9, WSP goal reachability analysis may be based on policy constraints, where the policy constraints may form the data values carried in the tokens (e.g., in contrast to the tokens of low-level Petri Nets). The CP Nets structure of these services may then be combined in accordance with the overall process flow. The user action conditions may then be specified as the conditions of firing in the guard functions of the corresponding transitions and arc functions of the input and output arcs.

Figure 10:
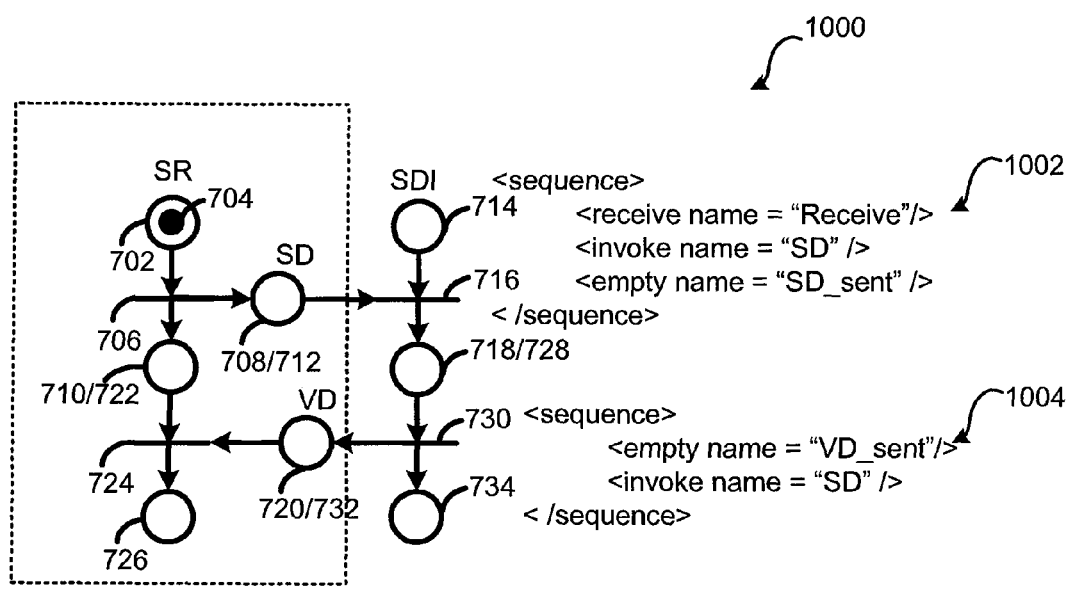
FIG. 10 is a block diagram of a conversion of a CPN fragment into an executable Business Process Execution Language (BPEL) structure.

FIG. 10 is a block diagram of a conversion of a CPN fragment, such as the CPN fragment 700 of FIG. 7, into an executable Business Process Execution Language (BPEL) structure 1000. As referenced above, BPEL extends the web services interaction model and supports inter-organizational processes by providing a formal specification of the interacting processes and the interaction protocols. BPEL is a Turing complete language which may include expressive XML representation of advanced constructs that supports graph-based and structured modeling. FIG. 10 illustrates transformation of the CP Nets as a source language to the block structured BPEL as a target language.

Transforming a graph structure to a block structure may involve the mapping of graph-based CP Nets onto a hierarchical decomposition of specific BPEL construct utilizing CP Nets fragments with a well defined start and end, e.g., a sequential fragment maps to the sequence construct whereas a parallel fragment maps to a flow construct. Within the fragments, transitions are marked with references to BPEL primitives, e.g., invoke—an operation call to a web service, receive—receive a message from a resource, reply—send a message to a resource, wait—induce a time delay, assign—transfer data, throw—identify exceptions, and empty—null operator. The CP Nets instances may then be mapped onto BPEL structures 1002, 1004, as shown, making use of these constructs. In some situations, this may occur as an automated or semi-automated methodology. In the latter case, complete BPEL code may be be completed by using these structures 1002, 1004 as a guide.

Thus, as may be appreciated from the above description, SOA-based application platforms may provide independent means of service composition and goal reachability analysis whereas goal reachability analysis of WSPs involves issues related to state, behavior and identity. Consequently, for example, HMSCs may be used for specification of the WSP prior to its actual execution with an aim to evaluate their local transitions, states and behavior before actually executing any sub processes, thereby evaluating the true request flow. This initial goal reachability analysis of the WSP y facilitate the identification of parts of the process flow that may have been implemented incorrectly and may have unforeseen results. Then, CP Nets may provide an operational level semantics formalism of HMSCs and facilitate the derivation of a deterministic automata model from diagrammatic specification techniques. The formal specification of processes and interaction protocols may be achieved through BPEL. BPEL facilitates the modeling of the behavior of executable processes that model actual behavior of a participant in an interaction and abstract processes. Abstract processes, in contrast, process descriptions for protocols that specify the mutually visible message exchange behavior of each of the parties involved in the protocol, without revealing their internal behavior.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A system comprising:
   at least one processor;
   non-transitory computer-readable storage medium including instructions executable by the at least one processor, the instructions configured to implement,
   a modeling tool configured to generate a diagrammatic representation of a service-based process, expressed using a diagrammatic modeling language, the diagrammatic representation including an interaction-based model in which elements interact with each other by passing chronologically-ordered messages in response to an occurrence of one or more events;
   a model converter configured to convert the diagrammatic representation into a formal model of the service-based process, the formal model including a Petri net-based formal model, wherein the model converter is configured to map the elements, the one or more events, and the chronologically-ordered messages of the diagrammatic model to the Petri net-based formal model;

a model verifier configured to apply constraints to the formal model to verify an operation of the service-based process and output a verified formal model; and a code generator configured to generate executable code therefrom for executing the service-based process therewith based on the verified formal model.

2. The system of claim 1 wherein the model verifier is configured to apply the constraints relative to credentials of a user of the service-based process, to thereby determine an extent of access of the user to one or more services of the service-based process.

3. The system of claim 1 comprising a simulator configured to simulate an operation of the verified formal model, based on credentials of a user requesting an instantiation of the service-based process, to thereby illustrate an extent of access of the user to one or more services of the service-based process.

4. The system of claim 1 wherein the modeling tool is configured to generate the diagrammatic representation using a message sequence chart (MSC).

5. The system of claim 4 wherein the modeling tool is configured to generate the diagrammatic representation using a high-level message sequence chart (HSMC).

6. The system of claim 4 wherein the Petri net-based formal model includes a colored Petri net (CPN) formal model, and the model converter is configured to convert the MSC-based diagrammatic representation into the CPN formal model.

7. The system of claim 6 wherein the model converter is configured, for each message of the MSC, to:
map a top of the MSC to a start place of the CPN;
map a bottom of the MSC to an end place of the CPN;
create an additional place to the start place for a receive event of the MSC corresponding to receipt of a message;
create and additional place to the end place for a send event of the MSC corresponding to sending of a the message;
fuse start places of each receive event with corresponding end places of each send event; and
fuse the additional places to the start places and the end places for corresponding pairs of send and receive events.

8. The system of claim 1 wherein the constraints include service policy constraints that are specific to services of the service-based process relative to credentials of potential service requestors thereof.

9. The system of claim 1 wherein the constraints include composition policy constraints specifying execution characteristics of services of the service-based process.

10. The system of claim 1 wherein the formal model is a colored Petri net formal model includes a colored Petri net (CPN) formal model, and wherein the model verifier is configured to represent a credential of a service requestor as either a token or a hole of a specified color, wherein the specified color is associated with one or more of the constraints that is also associated with the specified color.

11. The system of claim 10 wherein the model verifier is further configured to determine access of the user to a service of the service based process, based on whether the constraints identify the specified color for the service and whether the credential of the service requestor is a token or a hole.

12. The system of claim 1 wherein the code generator is configured to generate the code using Business Process Execution Language (BPEL).

13. The system of claim 12 wherein the Petri net-based formal model includes a colored Petri net (CPN) formal model, and wherein the code generator is configured to generate the code by marking transitions of fragments of the CPN formal model to BPEL primitives, and by mapping the fragments of the CPN formal model into corresponding BPEL structures comprising the BPEL primitives.

14. A computer-implemented method performed by a t least one processor, the method comprising:
generating, by the at least one processor a diagrammatic representation of a service-based process, expressed using a diagrammatic modeling language, the diagrammatic representation including an interaction-based model in which elements interact with each other by passing chronologically-ordered messages in response to an occurrence of one or more events;
converting, by the at least one processor, the diagrammatic representation into a formal model of the service-based process, the formal model including a Petri net-based formal model wherein the converting includes mapping the elements, the one or more events, an the chronologically-ordered messages of the diagrammatic model to the Petri net-based formal model;
applying by the at least one processor, constraints to the formal model to verify an operation of the service-based process and output a verified formal model; and
generating by the at least one processor, executable code therefrom for executing the service-based process therewith based on the verified formal model.

15. The method of claim 14 wherein generating the diagrammatic representation of the service-based process comprises: generating the diagrammatic representation as a message sequence chart (MSC).

16. The method of claim 15 wherein converting the Petri net-based formal model includes a color Petri net (CPN) formal model, and the converting the diagrammatic representation into the formal model further comprises:
converting the MSC into the (CPN) formal model in which each service of the service-based process is represented as a place of the CPN, and in which each place is associated with a color set specifying constraints associated with accessing the corresponding service.

17. The method of claim 16 wherein applying constraints to the formal model comprises:
determining user credentials associated with a service requester, each user credential associated with a token or a hole having a specified color; and
matching the user credentials to the constraints by determining access of the service requester to a service for a user credential and associated color expressed as a token, and restricting access of the service requestor to the service for a user credential and associated color expressed as a hole.

18. A computer program product tangibly embodied on a non-transitory computer-readable storage medium and including executable code that, when executed, is configured to cause a data processing apparatus to:
generate a diagrammatic representation of a service-based process, expressed using a diagrammatic modeling language, the diagrammatic representation including and interaction-based model in which elements interact with each other by passing chronologically-ordered messages in response to an occurrence of one or more events;
convert the diagrammatic representation into a formal model of the service-based process, the formal model including a Petri net-based formal model, wherein the convert includes mapping the elements, the one or more events, ant the chronologically-ordered messages of the diagrammatic model to the Petri net-based formal model;

apply constraints to the formal model to verify an operation of the service-based process and output a verified formal model; and generate executable code therefrom for executing the service-based process therewith based on the verified formal model.

19. The computer program product of claim 18 wherein the diagrammatic representation includes a message sequence chart (MSC) and the Petri net-based formal model includes a color Petri net (CPN) formal model, and wherein the diagrammatic representation is converted into the formal model by converting the MSC into the CPN formal model, and in which each place is associated with a color set specifying constraints associated with accessing the corresponding service.

20. The computer program product of claim 19 wherein the constraints are applied to the formal model by:

determining user credentials associated with a service requester, each user credential associated with a token or a hole having a specified color; and matching the user credentials to the constraints by determining access of the service requestor to a service for a user credential and associated color expressed as a token, and restricting access of the service requestor to the service for a user credential and associated color expressed as a hole.

\* \* \* \* \*